United States Patent [19]

Hayes

[11] Patent Number: 4,661,309
[45] Date of Patent: Apr. 28, 1987

[54] EQUIPMENT TRANSPORTER FOR NUCLEAR STEAM GENERATOR

[75] Inventor: Lawrence R. Hayes, Ringgold, Ga.

[73] Assignee: Combustion Engineering, Inc., Windsor, Conn.

[21] Appl. No.: 579,748

[22] Filed: Feb. 13, 1984

[51] Int. Cl.[4] ............................................. G21C 17/00
[52] U.S. Cl. ................................. 376/248; 376/249; 165/11.2
[58] Field of Search .............. 376/248, 249; 165/11 A

[56] References Cited

U.S. PATENT DOCUMENTS

| 4,172,492 | 10/1979 | Abell et al. | 165/11 A |
| 4,432,271 | 2/1984 | Wentzell et al. | 376/249 |
| 4,432,931 | 2/1984 | Lockett | 376/249 |
| 4,494,907 | 1/1985 | Coussau et al. | 376/246 |
| 4,503,506 | 3/1985 | Sturges, Jr. | 165/11 A |
| 4,515,747 | 5/1985 | Creek et al. | 376/249 |
| 4,521,844 | 6/1985 | Sturges, Jr. et al. | 165/11 A |
| 4,569,230 | 2/1986 | Asty et al. | 376/249 |

*Primary Examiner*—Salvatore Cangialosi
*Attorney, Agent, or Firm*—John H. Mulholland

[57] ABSTRACT

A motorized transporter is placed at the periphery of the tube bundle which extends up from the tube sheet within a nuclear steam generator shell. The transporter can be separated into parts as required to move it into and out of the limited space between the tube bundle and inside wall of the generator. A control station external the generator is connected by flexible cables to the transporter and its equipment in order to move the transporter, observe the transporter path for foreign objects, and retrieve such objects.

6 Claims, 4 Drawing Figures

EQUIPMENT TRANSPORTER FOR NUCLEAR STEAM GENERATOR

TECHNICAL FIELD

The present invention relates to a mechanism for mounting and transporting inspection and/or maintenance apparatus and moving these devices over the area of a nuclear steam generator tube sheet. More particularly, the invention relates to a transporter for equipment to search out and remove foreign objects, which transporter has been inserted into the confined space at the periphery of the tube bundle and within the internal wall of the nuclear steam generator.

BACKGROUND ART

A typical nuclear steam generator comprises a vertically oriented shell, a plurality of U-shaped tubes disposed in the shell so as to form a tube bundle, a tube sheet for supporting the tubes at the ends opposite their U-like curvature, a dividing plate which is arranged with the tube sheet to form a primary fluid inlet header at one end of the tube bundle and a primary fluid outlet header at the other end of the tube bundle, a primary fluid inlet nozzle in fluid communication with the inlet header, and a primary fluid outlet nozzle in fluid communication with the outlet header. The steam generator also comprises a wrapper sheet disposed between the tube bundle and the shell to form an annular chamber with the internal wall of the shell, and a feedwater ring disposed above the U-line curvature end of the tube bundle. The primary fluid having been heated by circulation through the reactor core enters the steam generator through the primary fluid inlet nozzle. From the primary fluid inlet nozzle, the primary fluid flows through the primary fluid inlet header, through the tubes of the bundle, out the primary fluid outlet header, through the primary fluid outlet nozzle to the remainder of the reactor coolant system. At the same time, feedwater is introduced to the steam generator through the feedwater ring. The feedwater is directed down the annular chamber adjacent to the shell until the tube sheet near the bottom of the annular chamber causes the feedwater to reverse direction, passing in heat transfer relationship with the outside of the U-shaped tubes of the bundle and up through the inside of the wrapper. While the feedwater is circulating in heat transfer relationship with the tubes of the bundle, heat is transferred from the primary fluid in the tubes to the feedwater over the outside of the tubes, causing some predetermined portion of the feedwater to be converted to steam. The steam then rises and is circulated through typical electrical generating equipment producing electrical energy in a manner well known in the art.

Since the primary fluid contains radioactive particles and is isolated from the feedwater only by the walls of the U-shaped tubes which may be constructed from Inconel, the U-tube walls form part of the primary boundary for isolating these radioactive particles. It is, therefore, important that the U-tubes be maintained defect-free so that no ruptures will occur in the U-tubes. However, experience has shown that under certain conditions the U-tubes may develop leaks therein which allow radioactive particles to contaminate the feedwater, a highly undesirable accident.

The subject matter of U.S. application Ser. No. 423,953 filed Sept. 27, 1982 by Creek, et al. discloses a transporter for inspecting defective tubes and sludge accumulation requiring removal, together with instruments with which sludge removal is initiated. However, a transport structure is needed with which to inspect the annular space between the tube bundle and the inside wall of the generator for objects requiring removal.

During repair and general inspection of steam generators, internal objects sometimes are accidentally dropped. These lost objects are likely to find their way to the annular space at the top of the tube sheet between the tube bundle and the vessel wall. Severe damage to tubes has resulted in some generators as a result of these lost objects impacting against the tubes during operation. Motion of these objects is caused by the recirculating fluid within the generator. There is a need for inspecting the annular region in nuclear steam generators to locate and remove foreign objects.

DISCLOSURE OF THE INVENTION

The present invention contemplates a motorized transport apparatus, readily disassembled and assembled for entry into and removal from the limited area between the tube bundle and shell wall of a nuclear steam generator.

The invention further contemplates control and power lines extending through an access opening in the shell of the steam generator to connect with the transporter and actuate the motor and inspection and retrieval apparatus mounted on the transporter.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Terms and Technology

Figure 1:
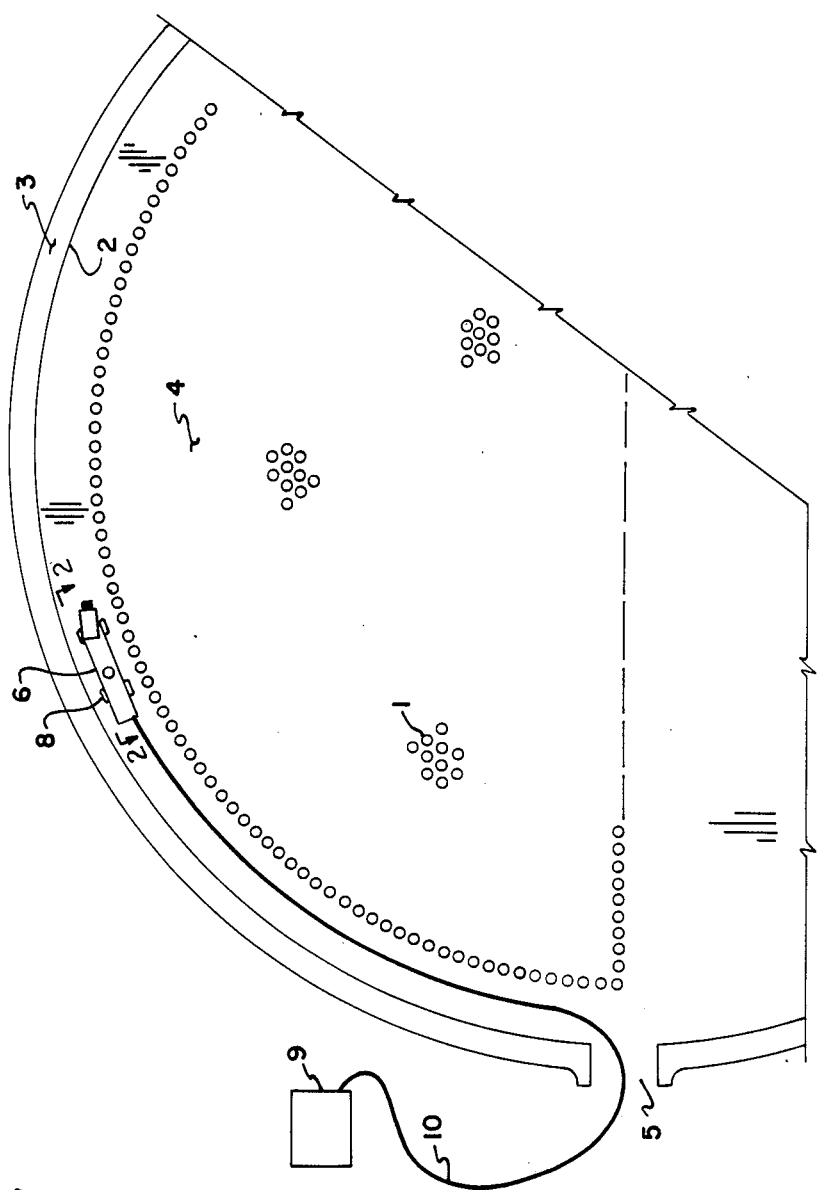
FIG. 1 is a sectioned plan view of a nuclear steam generator and transporter embodying the present invention.

In referring to a nuclear steam generator, it is reasonable to describe it as a tube and shell heat exchanger which, in turn, can be utilized to actuate a turbine to produce electrical energy. In further detail, the steam generator/heat exchanger is a vessel in which is mounted a bundle of tubes with which a primary fluid, heated by nuclear energy, is passed in indirect heat exchange with feedwater flowed over the outside of the tubes of the bundle. Present attention is focused on solid objects which collect upon the upper surface of the tube sheet. A wide variety of objects, such as weld metal, bolts, welding rods, and even tools, may be loosed in the annular space between the tube bundle and inside wall of the shell. These solid objects become erratically directed projectiles relative the tubes of the bundle under the force of the secondary fluid flowing through the exchanger. The present invention provides a means for locating these solid objects, bringing them under control, and removing them from the shell.

The flow pattern of feedwater over the tubes of the bundle is controlled by baffling within the vessel. The more important of these baffle structures is referred to as a wrapper which usually extends down from the upper regions of the vessel to within the order of 15" of the tube sheet. Incoming feedwater flows down the annular space, a downcomer formed between the wrapper and the inside of the vessel, and is released above the tube sheet to flow laterally to the tubes and up over the tubes of the bundle. A transporter, in which the present invention is embodied, is placed at this location on the tube sheet and beneath the lower edge of the wrapper.

The transporter is a conveyance which is adapted to move along the periphery of the tube bundle within the limited space provided between the bundle, the upper surface of the tube sheet, the inside wall of the vessel shell, and the lower edge of the wrapper. The conveyance will mount a T.V. camera remotely controlled to locate and identify solid objects to be controlled and removed with devices also mounted on the transporter.

The transporter is brought into the limited space at the periphery of the tube bundle through openings of limited size. Realistically, there are only two routes the transporter can utilize to reach its position on the tube sheet. First, the transporter can be taken down the annular space between the wrapper and the inside wall of the shell. This annular space is in the order of 3" wide. Alternatively, the transporter can be inserted through an aperture in the side of the shell, generally referred to as a handhole. The present invention anticipates the assembled transporter being inserted into the limited space at the periphery of the tube bundle through the handhole. Once in position within the limited space at the tube bundle periphery, the equipment for locating and removing solid objects is mounted on the transporter. It is also anticipated that when the transporter is in its operative position on the tube sheet, it will be connected to outside control and manifesting devices through control lines extending through the handhole in the side of the shell. Thereafter, the transporter can be energized and controlled to move along the periphery of the tube bundle and carry out its participation in the process of removing solid objects located on the surface of the tube sheet.

The Shell, Tube Bundle and Transporter

FIG. 1 is an unpretentious disclosure of the cramped, limited space available between tube bundle 1 and the inside wall 2 of shell 3 beneath the lower edge of the tube wrapper and above the surface of tube sheet 4. Access to this space is provided by handhole 5 through shell 3. As disclosed in FIG. 1, transporter 6 is positioned in the cramped space about tube bundle 1. This path on the upper surface of tube sheet 4 is traveled by transporter 6 which is supported on four wheels 8 and moved along its track between tube bundle 1 and wall 2 of shell 3. A control station 9 is mounted external shell 3 and is connected to the transporter by lines and/or conduits 10 with which the transporter's movements are controlled and with which the devices or tools mounted on the transporter may be operated. Thus, the invention provides for locating, controlling, and removing solid objects from the shell of the steam generator which can be reached from the track.

Zoom In On Transporter 6

Figure 2:
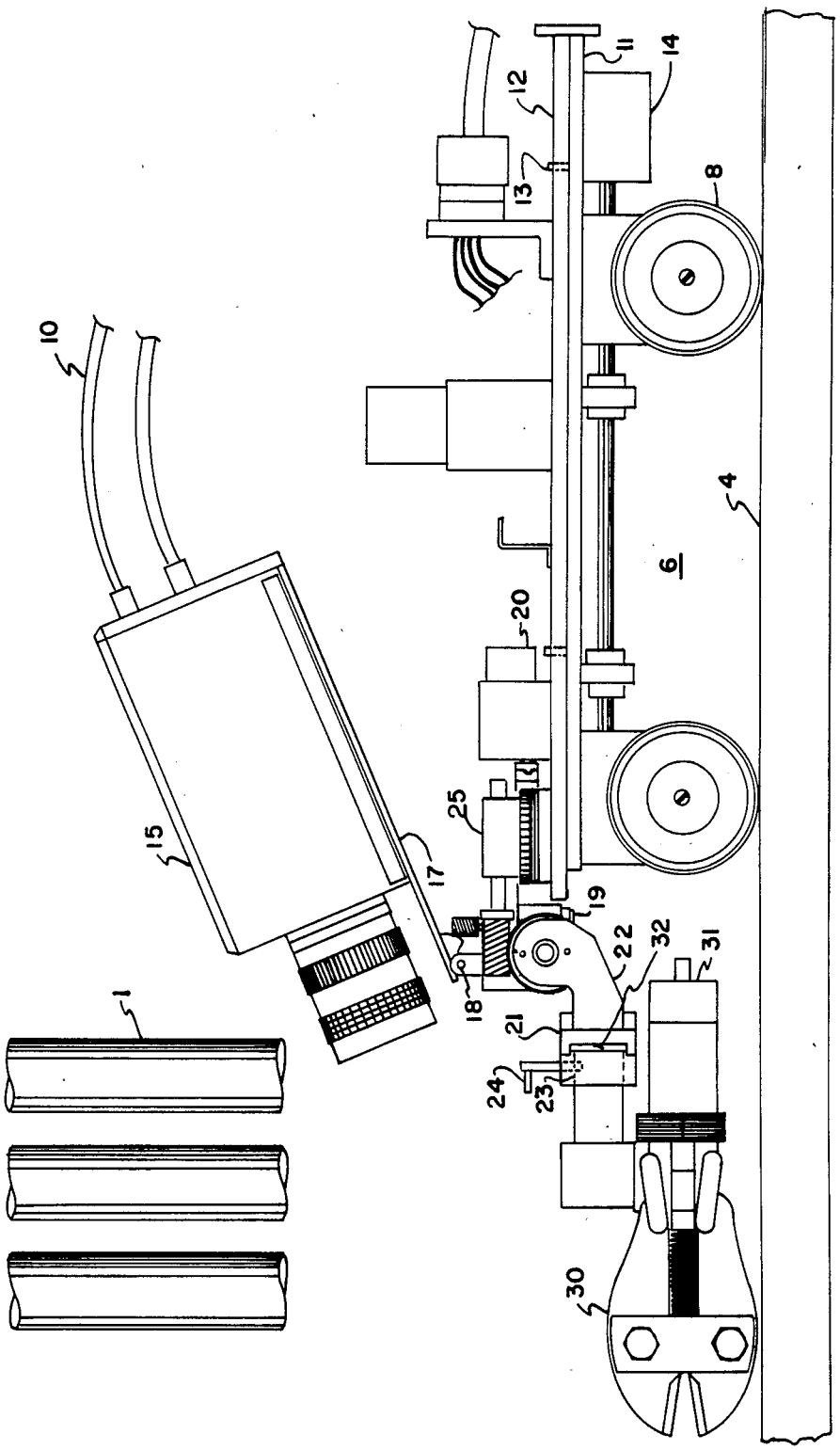
FIG. 2 is a side elevation of the transporter of Fig. 1 with a retrieval tool mounted thereon.
Figure 3:
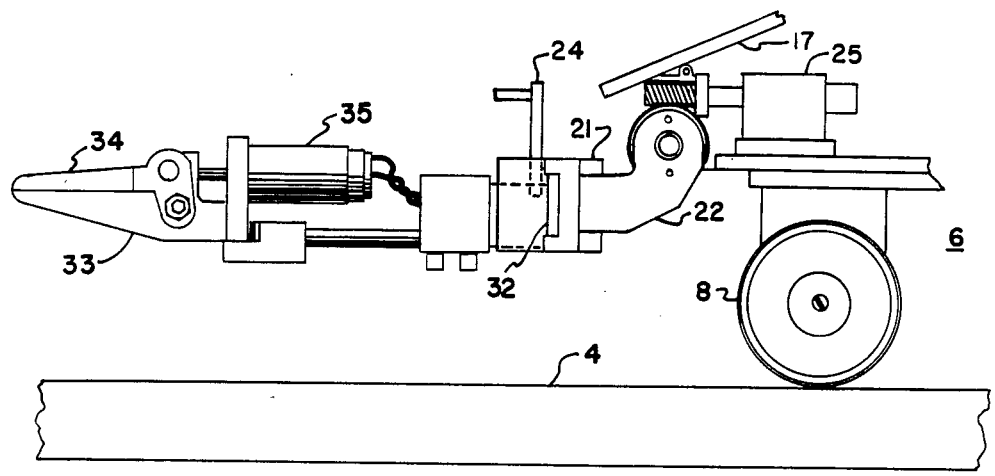
FIG. 3 is a side elevation of the front of the transporter mounting a second type of retrieval tool.
Figure 4:
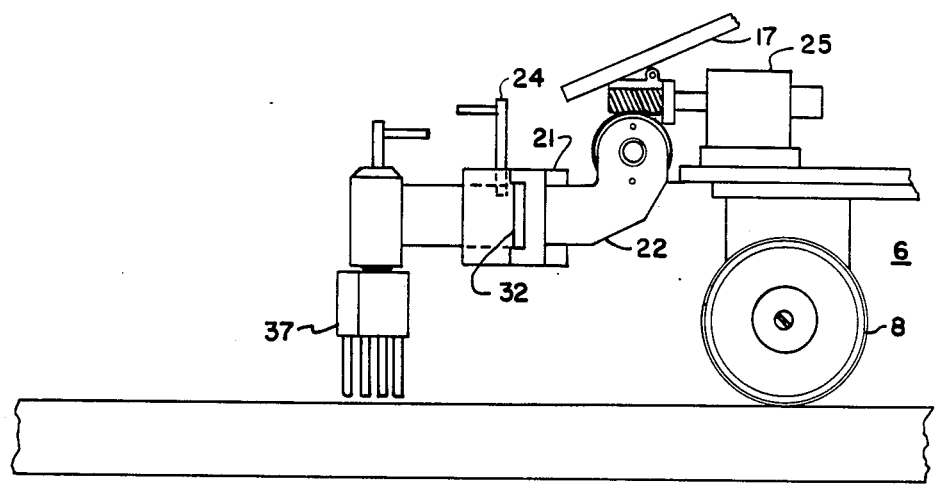
FIG. 4 is the transporter of FIG. 3 mounting a third type of retrieval tool.

FIG. 2 moves the viewer closer to disclose transporter 6 on which tools are mounted. Wheels 8 of the transporter roll on the upper surface of tube sheet 4. Wheels 8 are attached to axles mounted on a lower platform body 11. An upper platform body 12 is sized to match the lower platform body and keyed for assembly with holes to receive tapered pins 13 extending up from the lower platform body. Two pins and holes are disclosed in FIG. 2. It is anticipated that the transporter will be broken down by lifting the upper platform body from the lower platform and reassembled in the same way. A first motor 14 is provided to drive the wheels through a gear train between the motor and the axles. All the tools of the transporter are mounted from the upper platform body 12. Some, or all, of these tools can be individually removably mounted in further breakdown of the transporter through handhole 5. Figs. 3 and 4 represent the forward section of transporter 6 with alternate retrieval tools mounted thereon.

A T.V. camera 15 is mounted on top of a work station 17 on the front of the transporter and is tilted about a pivot 18 by a second motor 19 with a gear train which allows it to be remotely controlled to view within the limits of 15° up and 45° down. A third motor 20 is the power source for the horizontal movement of the work station to which the camera and retrieval tools are mounted and which gives the camera the capability of both pan and tilt operation for inspection viewing.

A boom arm 21 is mounted in front of the transporter between yoke arms 22 attached to the work station. The boom arm provides mounting for the various tools. Each tool is inserted into the boom arm aperture 23. Each tool has a hole to align with a plunger 24 extending through the top side of the boom arm to fit into the hole in the tool. Plunger 24 is spring-urged to exert a force on the plunger, holding it in a tool-locking position. When it is desired to remove the tool from the boom arm, the force of the spring is overcome by manually tugging the plunger upward and out of engagement with the hole in the tool. Movement of work station 17 moves both the T.V. camera and any tool mounted on the boom arm. A fourth motor 25 is the power source for vertical movement of work station 17 through an appropriate gear train. These are the provisions for the eye of the camera to follow the movement of the tool or implement for the search and removal of solid objects which will be taken out handhole 5.

In an actual reduction to practice of the invention, 3" diameter wheels of soft rubber (model airplane wheels) are used to support the transporter. Two W. M. Berg model No. WX64P4-3 worm wheel and helical assembly gear boxes with a drive ratio of 25 to 1 provide positive drive for all four wheels. The drive motor is Micro Mo model 2233 with a model 22/2, 308:1 ratio gear drive. Drive train couplings are Berg Model C020-11 and C020-14. Power is provided to the drive motor through electrical contacts of the type used in burglar alarm installations; Safe-House Model 49-518. The lower platform body is formed from $\frac{1}{4}" \times 13\frac{1}{2}" \times 2\frac{7}{8}"$ wide aluminum plate. The upper platform body is sized to match the lower platform.

The work station on the front of the cart provides a means of vertical and horizontal movements, allowing selected implements to perform various tasks. Power is provided for these movements from two Micro Mo 12 volt D.C. motors. Berg couplings (Model No. 5Z15-00136) provide accurate alignment as well as easy assembly and replacement of parts. Gearing is accomplished with a worm gear (Berg Mod. No. W4B29-S60) and a single pitch worm (Berg Mod. No. W48S-3S).

Bronze bearings are used at all pivot and gear locations. The spring plunger on the yoke is a Reid Tool Co. Model No. FR-250.

In FIG. 2, bolt cutters 30 are disclosed as the specific retrieval tool mounted to extend from implement boom arm 21, with jaws extending out to within the viewing range of the T.V. camera. The jaws are operated by a hydraulic piston-cylinder 31 so they may open and close on solid objects located by the camera. With the bolt cutters and camera mounted on the same work station, the camera views the objects engaged by the bolt cutters. Lamps 32 are mounted on the yoke arms to provide the illumination of objects to be engaged by the bolt cutters.

Mounting the bolt cutters on the transporter anticipates the encounter of objects which protrude into the path of the transporter. If these objects, such as welding rods, are lodged firmly so as to resist dislodgement, the bolt cutters can be utilized to remove that portion of the object that protrudes into the path. The cut portions of the objects fall onto the path and may be removed by other tools alternatively mounted on boom arm 21. The boom arm is formed and arranged to mount any number of devices or tools which can retrieve solid objects by bringing them to the handhole for manual removal. In the actual reduction to practice, a pair of 14" bolt cutters was modified to be operated with an Enerpac Model RWT-40 hydraulic cylinder. Water replaced the hydraulic fluid for use inside the steam generator.

Other Retrieval Tools

FIG. 3 discloses the front part of transporter 6 with retrieval pliers 33 mounted on boom arm 21. Bolt cutters 30 have been replaced by the pliers in order to retrieve solid objects in the path, including objects cut by the bolt cutters. Again, the objects to be retrieved are illuminated by the lights 32. So illuminated, the objects are viewed through the T.V. camera 15. Jaws 34 of pliers 33 are actuated by motor 35 so that by a combination of jaw actuation and rotation of station 17, the solid objects viewed by the camera may be secured and moved to handhole 5 for manual removal. In the actual reduction to practice the pliers are of the long nose type and electrically operated with a Micro Mo 12 V D.C. motor and gear reducer (Model 2233 F 012 ST+22/2 30.7:1) A No. 10-32 screw and threaded brass rod provide the power transmission to the jaws.

FIG. 4 discloses, as in FIG. 3, the forward portion of transporter 6. The boom arm is now supplied a device which may be characterized as a rake 37. It is anticipated there will be solid objects which are desired to be removed, yet cannot be grasped by plier jaws 34. Therefore, rake 37 represents still another form of tool which can be employed to move solid objects along the path under the eye of the camera. It is anticipated that with rake 37, objects can be moved along the path to the handhole close enough for manual removal.

The number of tools mounted on boom arm 21 is limited only by imagination. For each removal step, some sort of tool is mounted on boom arm 21 with the bottom-line result of moving all solid debris to the handhole for removal.

Conclusion

FIG. 1 discloses the cramped environment for the retrieval transporter in a nuclear steam generator. In FIG. 2, transporter 6 is disclosed as basically separable in two parts. Each part can be inserted into the steam generator through handhole 5. Reassembled as readily as disassembled, transporter 6 is connected by its umbilical cord to a control station 9 at which personnel can observe the path in front of the transporter through the eye of T.V. camera 15. Additionally, of course, control is exerted over the movement of the transporter and operation of any tool mounted thereon.

In generating a lucid description of the preferred embodiment, each of the motors, as power sources, have been called out by both numerals and its place in the description. For example, the first motor is designated 14, the second motor is 19, etc.

The basic function of the transporter is to go after solid objects which threaten the integrity of the internal parts of the steam generator. This retrieval function is carried out by the movement of the transporter along its path and operation of the tools mounted on boom arm 21. The following claims define the structure of the transporter and its numerous parts to make it perfectly clear how the combination carries out its ultimate function as a retrieval system.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A transporter for use in a steam generator of a nuclear power installation wherein the generator is essentially a heat exchanger having a vertically extended shell and across the lower portion of which extends a horizontal tube sheet having an upper surface and supporting a bundle of vertically extending tubes forming a limited annular space with the inside of the shell wall and said upper surface, and an opening of limited dimensions through the shell wall to gain manual access to the limited annular space, said transporter having means for locating and removing solid debris from the upper surface of the tube sheet in said annular space and having a means for assembly and disassembly of the transporter in order that it may be manually passed through the shell opening to and from a position on the upper surface of the tube sheet in the annular space, said transporter including:

a body, at least three wheels mounted on the body for engaging the upper surface of the tube sheet, a first motor mounted on the body drivingly connected to the wheels for moving the transporter along the upper surface of the tube sheet in the annular space, a remotely operated means on the body for locating solid debris on the upper surface of the tube sheet as the transporter is moved over the upper surface of the tube sheet in the annular space, and means for securing and removing solid debris on the upper surface of the tube sheet located by the means for locating.

2. The transporter of claim 1, which includes a flexible cable extending through the shell opening by which power is supplied to the transporter.

3. The transporter of claim 1 which includes a lower platform body portion on which the wheels and first motor are mounted and a camera as the means for locating, an upper platform body portion keyed to the lower platform body portion for assembly and disassembly, and mounting means on the front of the upper platform body portion for camera and retrieval apparatus to be separately moved in the locating and retrieval functions.

4. The transporter of claim 3, which includes a second motor drivingly connected to the camera to tilt the camera in a vertical plane to perform its locating function, and, third and fourth motors drivingly connected to the retrieval apparatus to move the apparatus horizontally and vertically to secure and remove any solid debris located by the camera.

5. A transporter for mounting working tools with which to remove solid debris from a nuclear steam generator, including, a lower platform on which to mount wheels drivingly connected to a first motor by which the transporter is moved in a limited annular space between a bundle of heat exchange tubes and the inside wall of the steam generator, an upper platform and means for mounting said upper platform in a manner permitting said upper platform to be readily removable from the lower platform, a work station mounted on the upper platform to which is mounted a T.V. camera and a tool mounted extending forward of the transporter in order to control and manipulate any solid debris viewed through the camera, a second motor drivingly connected to the T.V. camera to tilt the camera in a vertical plane, a third motor drivingly connected to the work station with which to move the work station in a horizontal plane, and means on the work station to removably mount a retrieval tool for removing solid debris from the path of the transporter.

6. The transporter of claim 5 which includes a fourth motor drivingly connected to move the work station in a vertical plane.

* * * * *